Nov. 29, 1927. 1,650,960

J. G. RITTER

TRUCK STRUCTURE

Filed Aug. 13, 1925

WITNESSES:

INVENTOR
John G. Ritter
BY
ATTORNEY

Patented Nov. 29, 1927.

1,650,960

UNITED STATES PATENT OFFICE.

JOHN G. RITTER, OF WILKINSBURG, PENNSYLVANIA, ASSIGNOR TO WESTINGHOUSE ELECTRIC & MANUFACTURING COMPANY, A CORPORATION OF PENNSYLVANIA.

TRUCK STRUCTURE.

Application filed August 13, 1925. Serial No. 49,898.

My invention relates to railway vehicles, more particularly to steering trucks for railway vehicles for providing a positive leading or steering characteristic and a negative or idle trailing characteristic, to effect the proper steering of the vehicle relative to the curvature of the tracks at all times.

It is among the objects of my invention to provide a steering truck for railway vehicles which shall be of simple, compact, and durable mechanical construction, which shall comprise a minimum number of simple and accessible cooperating parts and which shall be efficient in its operation to provide a leading or trailing action of the vehicle with respect to the rails.

Another object of my invention is to provide a steering truck embodying steering means which shall be positive, reliable and automatic in its function of converting the truck to either a steering or a trailing unit.

Various forms of leading and trailing trucks have been devised which utilize a mechanical linkage for effecting a steering or idle characteristic of the truck member in accordance with its position as a leading or a trailing truck as the case may be. The usual construction embodies a plurality of compression or suspension members of cam shape and which are associated with suitable actuating mechanism to effect relative dispositions of said members for the various positions the vehicle may assume with respect to the rails upon which it operates.

My present invention contemplates the use of cam rockers that are associated with the truck frame and the swing bolster upon which the vehicle is supported, in such manner that they may be raised off the truck frame for providing a trailing truck and seated on the frame when it functions as a leading truck. The means for raising and lowering the cams embodies pressure-actuated piston members, which are operated through a fluid-pressure system that may be controlled in any suitable manner, either by the operator or automatically by control means associated with the drive mechanism of the vehicle.

Figure 1:
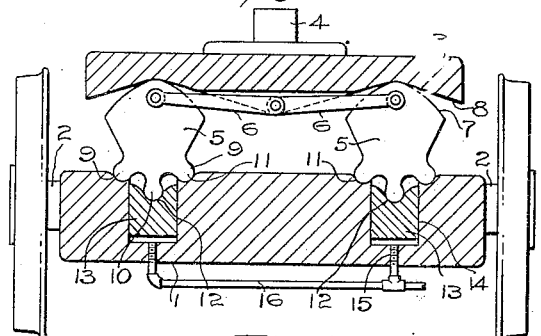
Figure 2:
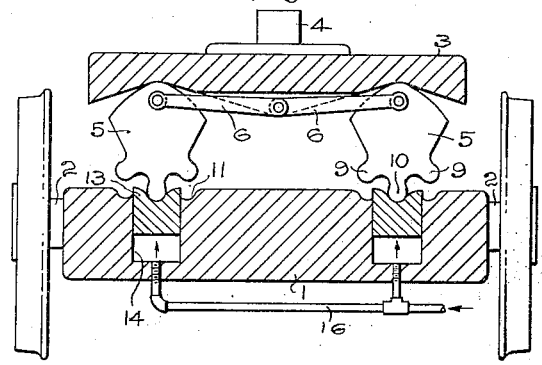
Figure 3:
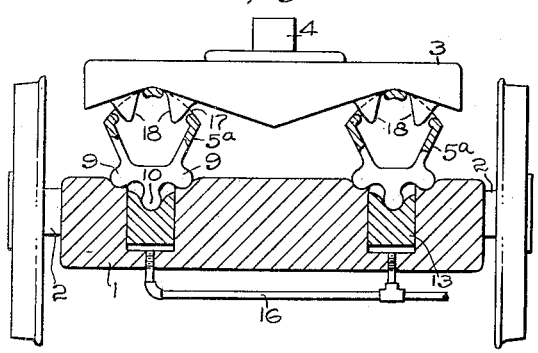

In the accompanying drawing, constituting a part hereof, and in which like reference characters designate like parts, Fig. 1 is a view in cross-section of a truck frame and bolster embodying a cam rocker construction in accordance with the principles of my invention, the cam rockers being shown in the position they assume when the truck has a leading characteristic, Fig. 2 is a similar view showing the cam rockers in the position corresponding to an idle or trailing truck, and Fig. 3 is a view similar to Figs. 1 and 2, illustrating a somewhat modified form of cam rocker that has the same functional characteristic as the cam rockers shown in Figs. 1 and 2.

Referring to Figs. 1 and 2 of the drawing, the structure therein illustrated comprises a truck frame 1 that is journalled in a plurality of wheeled axles 2 and has a swing bolster 3 mounted in cooperative relation therewith. The bolster 3 is provided with a center pin construction 4 for connecting the bolster to the vehicle that it supports.

A plurality of cam rockers 5 are disposed between the truck frame 1 and the bolster 3. A plurality of straight links or rods 6 are respectively pivoted to the upper portions of the cam rockers 5 and are pivoted together midway between said cam rockers. The upper convex surfaces 7 of the cam rockers 5 are shaped to be in part, complementary with respect to the concave faces 8 of the bolster 3 with which they cooperate. The lower portions of the cam rockers 5 are provided with convex projections 9 and 10 that are adapted to respectively engage the cooperating concave seats 11 and 12 of the truck frame 1 and of a pair of piston members 13.

The pistons are disposed in cylindrical openings 14 that are provided in truck frame 1, which openings communicate with pipes or passages 15 that are connected to a pipe line 16 constituting a portion of a fluid-pressure system. Any suitable manually or automatically controlled means may be employed to govern the application of the fluid pressure.

The modification shown in Fig. 3 comprises a cam rocker 5a having slotted openings 17 that are adapted to receive lugs 18 projecting from the bolster 3 for the purpose of co-ordinating the movements of the cam rockers, or of maintaining positive relations of the cam rockers with respect to the bolster, which is provided for by the links 6 in the construction shown in Figs. 1 and 2.

The operation of my invention is briefly as follows. As shown in Fig. 1, the arrangement of the bolster 3, the truck 1 and the cam rockers 5 is such as to constitute the truck a leading member to steer the vehicle when the latter enters a curve from a tangent track or vice versa, and to maintain the cam rockers in this position, no pressure is employed in the system communicating with the pistons 13.

In Fig. 2, the cam rockers 5 are shown in a raised position with the projections 9 disengaged from their seats 11 in the truck frame 1, the only engagement being with the central lower projections 10, which rest upon the seats 12 that are provided in the ends of the pistons 13. This raised position of the cam rockers is brought about by suitable pressure in the pipe line 16 and is maintained during the function of the truck as a trailing member.

The leading and trailing or steering and idle characteristics of the truck are produced by the nature of the engagement of the cam rockers 5 with the truck frame and bolster, as it is obvious that the seating of the cam rockers, as shown in Fig. 1, has a decided restraining influence on the movement of the truck member relative to the bolster, which results in a steering action; whereas the position of the cam rockers, as shown in Fig. 2, permits freedom of movement between the truck and bolster, which results in an idle or trailing action of the truck.

The cam rockers shown in the modification of Fig. 3 function similarly to those shown in Figs. 1 and 2, with the exception that the projections 18 of the bolster maintain the proper position of the cam rockers 5a with respect to the bolster in the same manner as the links or rods 6 in the structure shown in Figs. 1 and 2.

It is evident from the foregoing description of my invention that a steering truck made in accordance therewith provides a simple and efficient means for steering a railway vehicle along the tracks and that such device is of simple mechanical construction and lends itself to a rugged design to provide adequate strength of the operating parts. Such steering truck may be applied as standard equipment to either steam or electric railway locomotives or cars, without requiring any modifications or alterations of the frame portions or body construction of such vehicles.

Although I have described a specific embodiment of my invention, it will be obvious to those skilled in the art that various modifications may be made in the details of construction and in the relation and proportion of the several cooperating parts without departing from the principles herein set forth.

I claim as my invention:

1. In a railway vehicle truck, the combination with a truck frame, of a bolster therefor, cam rockers disposed between said frame and bolster, and means for effecting engagement or disengagement of the cam rockers with respect to the frame to effect a leading or trailing characteristic of the truck.

2. In a railway vehicle truck, the combination with a truck frame, of a bolster therefor, a compression member disposed between said frame and bolster, and fluid pressure means for effecting engagement or disengagement of the member with respect to the frame to effect a leading or trailing characteristic of the truck.

3. In a railway vehicle truck, the combination with a truck frame, of a bolster therefor, a compression member disposed between said frame and bolster, means for seating said member on the truck frame, and means for raising said member off said frame to effect a leading and trailing characteristic of the truck for the respective positions of said member.

4. In a railway vehicle truck, the combination with a truck frame, of a bolster therefor, compression members disposed between said frame and bolster, means for seating said members on the truck frame, and fluid-pressure means for raising said members off said frame to effect a leading and trailing characteristic of the truck for the respective positions of said members.

5. In a railway vehicle truck, the combination with a truck frame, of a swing bolster associated therewith, a plurality of cam rockers disposed between said frame and said bolster, means for coordinating the swinging movements of said cam rockers, and means for engaging and disengaging said cam rockers and said frame.

6. In a railway vehicle truck, the combination with a truck frame, of a swing bolster associated therewith, a plurality of cam rockers disposed between said frame and said bolster, means for coordinating the swinging movements of said cam rockers, and fluid-pressure means for engaging and disengaging said cam rockers and said frame.

7. A steering truck for railway vehicles comprising a truck body, a swing bolster associated therewith, a plurality of cam rockers disposed between said body and said bolster, a plurality of links connecting said cam rockers, and means for lifting said cam rockers off the truck body.

8. A steering truck for railway vehicles comprising a truck body, a swing bolster associated therewith, a plurality of cam rockers disposed between said body and said bolster, a pair of links connecting said cam rockers, and means for lifting said cam rockers off the truck body, said means comprising pressure-actuated piston members.

9. A steering truck for railway vehicles comprising a truck body, a swing bolster associated therewith, a plurality of cam rockers disposed between said body and said bolster, a pair of links connecting said cam rockers, and means for lifting said cam rockers off the truck body, said means comprising pressure-actuated piston members operative to lift said cam rockers when the truck is in a trailing position.

In testimony whereof, I have hereunto subscribed my name this 5th day of August 1925.

JOHN G. RITTER.